United States Patent Office 3,375,879
Patented Apr. 2, 1968

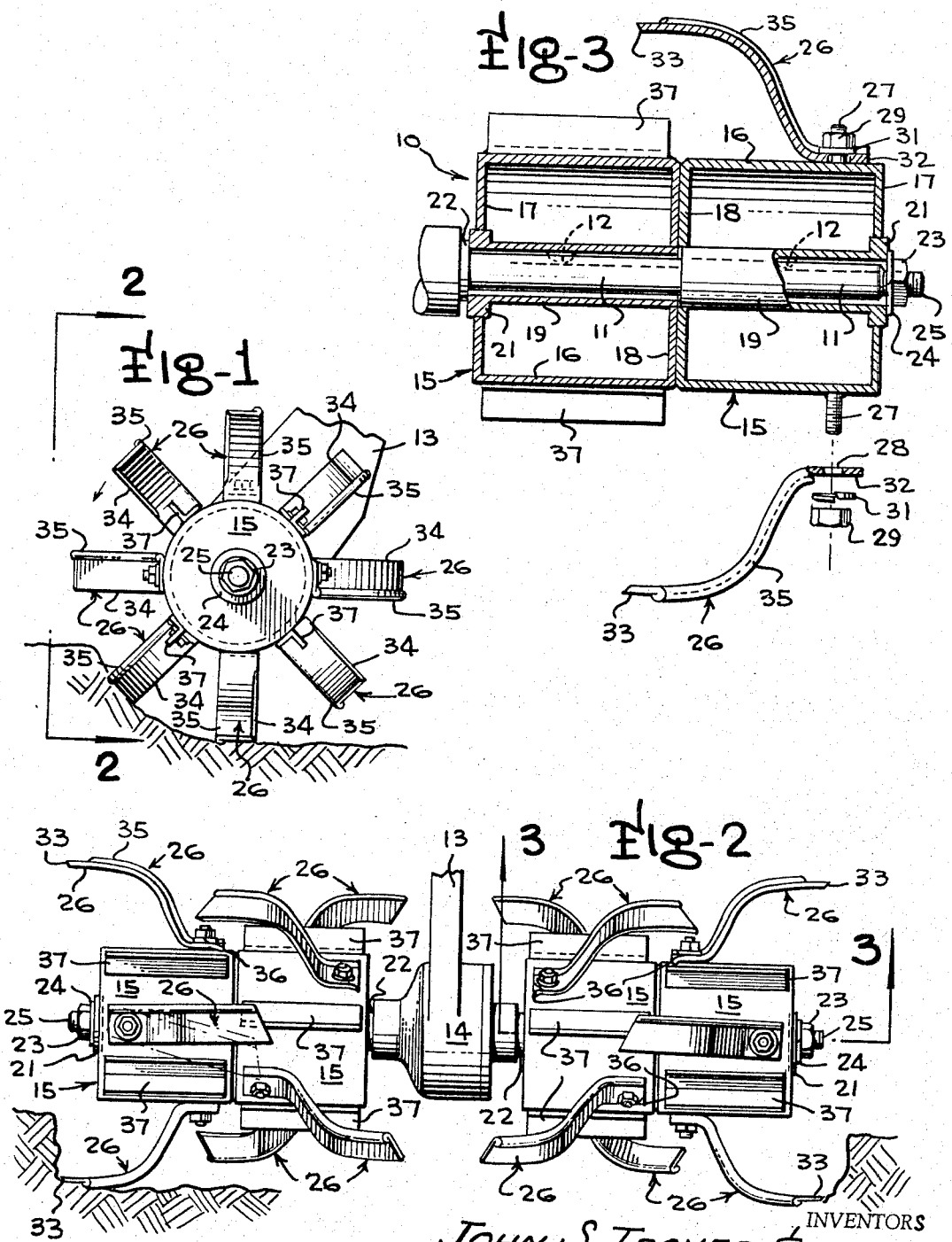

3,375,879
SOIL PULVERIZING UNIT
John S. Troyer and Margarita G. Troyer, both of Trevilians, Va. 23170
Filed Feb. 7, 1966, Ser. No. 525,681
7 Claims. (Cl. 172—122)

ABSTRACT OF THE DISCLOSURE

A soil tiller with a driven hub having circumferentially attached elongated radial tines and intermediate radially projecting means individually between the tines extending radially less than the tines to pulverize soil when the hub is closely adjacent the ground.

---

This invention relates in general to a machine for cultivating the soil and more particularly to a cultivating tine arrangement easily attached to a normal rotary cultivator to effect cultivation and pulverization of the soil.

Generally in small garden rotary cultivators of the type herein described, the soil engaging implements are relatively small and do not make a wide cultivated strip on one pass of the cultivator. In addition, the normal cultivator is generally ineffective on certain types of earth and this leaves the possibility that large clods of earth may be picked up and redeposited in the cultivated area without first being finely pulverized. In order to make a proper seed bed, all weeds and other foreign matter, including the soil, need to be properly cultivated in a manner which has not normally heretofore been possible.

Therefore, an object of this invention is the provision of a soil cutting implement for cultivators which will easily effect proper cultivation and pulverization of the earth.

Another object of this invention is the provision of a soil cutting implement for cultivators having an enlarged hub ararngement upon which is peripherally mounted a plurality of soil engaging tines with means mounted on the hub between the tines to assist in breaking up and pulverizing the soil.

Another object of this invention is the provision of a soil cutting implement for cultivators having tines mounted in staggered rows upon the drive hub in a manner so that the arc of travel of each tine overlaps that of an adjacently disposed tine.

Another object of this invention is the provision of a cultivator having a soil engaging drive hub of significant diameter and of significant length to permit a wide cultivated area.

Another object of this invention is the provision of a drive means for cultivators comprising a plurality of removable drive hubs upon the drive shaft of the cultivator wherein the drive hubs have affixed thereto removable soil engaging tines.

Other objects, advantages and capabilities of the invention will become apparent from the following description, taken in conjunction with the accompanying drawings showing only a preferred embodiment of the invention.

In the drawings:

FIGURE 1 is an end elevation view of the drive hub and tine arrangement of the present invention;

FIGURE 2 is a front elevation view of a portion of a rotary cultivator showing the complete hub and tine arrangement of the present invention; looking along lines 2—2 of FIGURE 1; and FIGURE 3 is a vertical section view of the hub and tine arrangement taken along lines 3—3 of FIGURE 2.

Referring to the drawing wherein like reference characters designate corresponding parts throughout the several figures, the drive hub arrangement is generally indicated by the numeral 10. The drive hub arrangement 10 is generally affixed to a hub drive shaft 11 by key means indicated in FIGURE 3 by the numeral 12. The dual hub drive shafts 11 are suitably driven by the rotary cultivator (not shown) through a main power shaft housing 13 and by suitable gearing located in the gearing housing 14.

Upon each drive shaft hub 11 may be located a plurality of cylindrical drive hubs 15. Each of the drive hubs are identical so that they may be interchanged with one another and easily replaced should one become inoperative. Generally, the drive hubs 15 are constructed of a rigid housing comprising an outer cylindrical shell 16 closed by end members 17 and 18. Each of the end members have registered apertures interconnected by a sleeve 19 which is adapted to receive therethrough the hub drive shaft 11 in keyed relation. The end of the sleeve 19, which is affixed within end member 17, has a shoulder portion 21 which is suitably reenforced to provide a rigid bearing surface when the hub is pressed against either the shaft shoulder 22 or is engaged by the retaining nut 23 and retaining washer 24. The retaining nut 23 is threaded upon the threaded portion 25 of the hub drive shaft. In this manner, when the nut 23 is tightened upon the drive shaft, the hubs 15 are firmly maintained upon the shaft 11. However, it should be noted that the invention also contemplates using only one drive hub upon each shaft 11 if it is desired that a slightly more narrow area of cultivation be effected at any one time. If this is desired, then the outermost hub 15 would be removed and a suitable spacer sleeve (not shown) would be placed upon the shaft 11 between the inner hub 15 and the washer 24 so as to maintain the remaining hub firmly upon the shaft.

Each of the hubs 15 have a plurality of ground engaging soil cutting tines 26 which are affixed to the hub by means of aperture 28 being fitted about an outwardly projecting threaded stud 27 and maintained thereon by the tine retaining nut 29 and washer 31 which are adapted to be tightened down upon the stud 27. Each tine 26 generally comprises a fixed end 32 and a free end 33 having located therebetween a leading cutting edge 34 and a trailing edge 35. In order to prevent the tines from rotating about the stud 27 there is provided at the fixed end 32 a downwardly bent barb 36 which engages the cylindrical shell 16 to prevent the rotation of the tine about stud 27 when resistance is encountered as the tine strikes the earth. The fixed end of each tine is generally tangential to the peripheral surface of the cylindrical shell 16 and thereafter extends radially of the hub 15 to gently curve towards the free end so that the free end lies generally parallel to the longitudinal length of the hub. However, it should be noted that the tines 26 are adjustable about stud 27 so that the tines may be set for different angles of attack relative to the ground.

As is evident from the figures, each adjacently disposed tine on each hub is oppositely mounted upon the hub so that the fixed end of one tine, for example, may be mounted near end 17 and the fixed end of the last adjacent tine is mounted near end 18. Such an arrangement obviously provides excellent results in that there is no uncultivated area corresponding to the portion of the tine which does not engage the soil. In addition, when there are two hubs affixed to the drive shaft 11, the tines of the adjacent hubs overlap in staggered relation so that there is no uncultivated area corresponding to the juncture of the hub.

An especially important concept of the present invention is the desirability of having each hub 15 of substantial diameter in order that the outer peripheral surface of the cylindrical shell 16 will be placed in close relation to the soil as it is being cultivated. Between the adjacently disposed tines 26 of each hub 15 there is mounted a radially projecting elongated soil pulverizer 37. The pulverizer 37 generally has a length corresponding to that of the hub and its configuration may well take the shape of a piece of angle iron as shown in the drawings. However, in actual manufacture the configuration of the soil pulverizer 37 should have a radial extent such that it projects in a manner which will effect the destruction of large clods of soil disengaged from the earth during the cultivation process. If large clods of soil are disengaged, it is obvious that they will be entrapped between the cylindrical shell 16 and the earth, thereby being pulverized and ground as the hub 15 is rotated through its normal arc.

In operation of the present invention the rotary cultivator is operated in a normal manner and the hubs 15 are affixed thereto so as to permit the leading edge 34 of each tine to strike the earth initially and the reenforced trailing edge 35 of the tine to enter the ground last. The assembly herein described permits the cutting of each furrow in such a manner that no unplowed ground is left in the furrow or between the adjacently disposed hubs of a single drive shaft. This assembly and drive hub permits more efficient operation in plowing, it requires less power than a rotary cultivator, it saves time because it obviates the need for plowing repeatedly over the same furrows, it completely turns the ground in all furrows which are cultivated and is eminently adapted for the purposes disclosed.

While we have particularly shown and described one particular embodiment of the invention, it is distinctly understood that the invention is not limited thereto, but that modifications may be made within the scope of the invention and such variations as are covered by the scope of the appended claims.

What is claimed is:

1. A rotary tiller for cultivating the soil having at least one elongated longitudinal outwardly extending drive shaft arranged at right angles to the direction of tiller travel; the improvement comprising at least one elongated drive hub of enlarged cross section removably mounted upon the drive shaft for rotation therewith, the drive hub having spaced mounting studs projecting radially outwardly therefrom, a plurality of removable tilling tines of elongated configuration spaced circumferentially about the hub and having one end affixed to the mounting studs in a predetermined arrangement, each tilling tine having a leading edge and a trailing edge extending from the fixed end to a free end spaced outwardly from the surface of the hub, the elongation of each tine being so disposed as to generally follow the longitudinal centerline of the drive shaft, radially projecting means integral with the hub and positioned circumferentially intermediate of adjacently disposed tines to effect pulverization of the entrapped soil between the tines as the hub rotates closely adjacent to and across the ground.

2. The apparatus as set forth in claim 1, wherein the drive hub has first and second end members, the mounting studs being disposed upon the drive hub near the end members in staggered relation alternating between the confines of the end members, each fixed end of the tines having a projecting barb engaging the hub adapted to prevent movement of the tine relative to the hub.

3. The apparatus as set forth in claim 2, wherein the mid portion of each tine between the fixed end and the free end projects substantially radially outward to a juncture with a curved portion of the tine which positions the free end of the tine in substantial parallelism with the longitudinal centerline of the drive hub.

4. The apparatus as set forth in claim 3, wherein the radially projecting means integral with the drive hub to effect pulverization of the soil comprises an upstanding member extending parallel to and substantially across the length of the drive hub.

5. The apparatus as set forth in claim 4, wherein the free ends of adjacently disposed tines face in opposite directions.

6. The apparatus as set forth in claim 5, wherein a plurality of individual drive hubs are mounted upon each drive shaft in an end-to-end relation.

7. The apparatus as set forth in claim 2, wherein the mid portion of each tine between the fixed end and the free end projects substantially radially outward to a juncture with a curved portion of the tine, each tine being adjustable upon the mounting studs to permit varying angles of attack of the tine to the ground as the hub is rotated.

References Cited

UNITED STATES PATENTS 2,802,408   8/1957   Seaman _____ 172—548

FOREIGN PATENTS 6,555   5/1904   Denmark.

ANTONIO F. GUIDA, *Primary Examiner.*

ABRAHAM G. STONE, *Examiner.*

J. R. OAKS, *Assistant Examiner.*